US012251847B1

(12) United States Patent
Mueller

(10) Patent No.: US 12,251,847 B1
(45) Date of Patent: Mar. 18, 2025

(54) SHAVING APPARATUS WITH SLIP PROOF GRIP

(71) Applicant: York Mueller, Danbury, CT (US)

(72) Inventor: York Mueller, Danbury, CT (US)

( * ) Notice: Subject to any disclaimer, the term of this patent is extended or adjusted under 35 U.S.C. 154(b) by 0 days.

(21) Appl. No.: 18/387,199

(22) Filed: Nov. 6, 2023

(51) Int. Cl.
*B26B 21/52* (2006.01)

(52) U.S. Cl.
CPC .......... *B26B 21/522* (2013.01); *B26B 21/521* (2013.01)

(58) Field of Classification Search
CPC ...... B26B 21/52; B26B 21/521; B26B 21/522
USPC .............. 30/526–536; D28/46–48; 15/167.1; D4/104
See application file for complete search history.

(56) References Cited

U.S. PATENT DOCUMENTS

| | | | | | | |
|---|---|---|---|---|---|---|
| 2,077,758 | A | * | 4/1937 | Johnson et al. | A46B 5/0033 | 15/167.1 |
| D107,228 | S | * | 11/1937 | Goodman | A46B 9/04 | 15/167.1 |
| 2,118,498 | A | * | 5/1938 | Drew | B26B 21/18 | 30/74.1 |
| 2,179,266 | A | * | 11/1939 | Lukenbill | A46B 15/00 | 15/167.1 |
| D162,941 | S | * | 4/1951 | Ehrman | 15/167.1 | |
| D169,147 | S | * | 3/1953 | Lamb | 30/526 | |
| 2,645,009 | A | | 7/1953 | Cohen | | |
| D178,614 | S | * | 8/1956 | Parker | D28/46 | |
| 3,067,446 | A | * | 12/1962 | McGauley | A46B 5/026 | 15/167.1 |
| D218,001 | S | * | 7/1970 | Goyke et al. | D28/48 | |
| D235,696 | S | * | 7/1975 | Krupski | D28/48 | |
| 4,399,582 | A | * | 8/1983 | Ernest | A46B 5/02 | 15/167.1 |
| D279,824 | S | * | 7/1985 | Halm | D28/48 | |
| 4,589,159 | A | * | 5/1986 | Streibel | A46B 15/0085 | 15/167.1 |
| 5,031,319 | A | * | 7/1991 | Althaus | B26B 21/522 | 30/526 |
| 5,438,726 | A | * | 8/1995 | Leite | A46B 15/004 | 15/167.1 |
| 5,499,422 | A | * | 3/1996 | Lavazoli | A46B 7/02 | 15/167.1 |
| 5,590,436 | A | * | 1/1997 | Wright | A46B 15/0085 | 15/167.1 |
| 5,749,116 | A | * | 5/1998 | Wieder | A46B 5/02 | 15/167.1 |
| 6,273,719 | B1 | * | 8/2001 | Whitman | A46B 15/0081 | 15/167.1 |
| 6,308,365 | B1 | * | 10/2001 | Huang | A46B 5/02 | 15/167.1 |
| 6,345,406 | B1 | * | 2/2002 | Dodd | A46B 5/0095 | 15/167.1 |
| 6,546,583 | B1 | * | 4/2003 | Rohrig | A46B 17/08 | 15/167.1 |

(Continued)

FOREIGN PATENT DOCUMENTS

WO 2012005839 A2 1/2012

*Primary Examiner* — Jason Daniel Prone
(74) *Attorney, Agent, or Firm* — Ware Fressola Maguire & Barber LLP

(57) ABSTRACT

A shaving apparatus is provided with bulges and gaps for a slip proof grip is disclosed. Precise bulges and gaps on the handle of the shaving apparatus contour to the hand and fingers in a variety of reliable positions adjusting to one's personal shaving technique.

9 Claims, 13 Drawing Sheets

(56) References Cited

U.S. PATENT DOCUMENTS 6,698,065 B2 * 3/2004 Lauer ........................ B25G 1/00
16/DIG. 12
D506,288 S 6/2005 Leece et al.
D541,986 S * 5/2007 Drivas ........................... D28/45
D558,923 S * 1/2008 Watson .......................... D28/48
D565,245 S 3/2008 Wonderley
7,389,781 B2 * 6/2008 Kemp ................ A46B 15/0055
132/308
D575,903 S * 8/2008 Wakayama .................... D28/48
D587,403 S 2/2009 Wonderley
D603,098 S 10/2009 Cataudella
D611,654 S * 3/2010 Nakasuka ...................... D28/48
D612,991 S 3/2010 Cataudella
D616,147 S * 5/2010 Adams ........................... D28/46
D617,950 S 6/2010 Christie et al.
D619,763 S 7/2010 Coresh
D621,095 S 8/2010 Cataudella
D625,882 S 10/2010 Wonderley et al.
D629,160 S * 12/2010 Nanda ............................ D28/48
D634,894 S 3/2011 Cataudella
D638,580 S 5/2011 Adams et al.
D640,004 S 6/2011 Wonderley et al.
7,975,389 B2 7/2011 Bozikis et al.
8,006,393 B2 8/2011 Collins
D650,947 S 12/2011 Cataudella et al.
D654,222 S 2/2012 Coresh
8,151,469 B2 4/2012 Schulz
D664,715 S 7/2012 Wain et al.
D667,168 S * 9/2012 Greene .......................... D28/48
8,382,208 B2 * 2/2013 Baertschi ........... A46B 15/0081
15/167.1
8,769,825 B2 7/2014 Howell et al.
8,938,885 B2 1/2015 Stevens
9,073,226 B2 7/2015 Szczepanowski et al.
D739,604 S 9/2015 Christie et al.
D739,605 S 9/2015 Christie et al.
D743,177 S 11/2015 Gibson
D745,215 S 12/2015 Go
D749,784 S 2/2016 Go
D750,324 S 2/2016 Bae
D766,505 S 9/2016 Coviello
D773,734 S 12/2016 Li et al.
D776,876 S 1/2017 Coviello
D789,609 S 6/2017 Kong
9,694,504 B2 7/2017 Gratsias et al.
9,707,689 B2 7/2017 Stiles
D815,354 S 4/2018 Psimadas et al.
D819,889 S * 6/2018 Lyles ............................. D28/48
D822,279 S 7/2018 Newman
D838,040 S * 1/2019 Mayberry ...................... D28/46
D842,542 S 3/2019 Ramm et al.
D842,544 S 3/2019 Ramm et al.
D843,659 S 3/2019 Go
10,244,856 B1 * 4/2019 Horsky .................. B25G 1/102
D864,482 S 10/2019 Goeder et al.
10,427,312 B2 10/2019 Gratsias et al.
10,532,455 B1 * 1/2020 Krok ...................... B25G 1/102
10,538,008 B2 1/2020 Gratsias et al.
D876,722 S 2/2020 Psimadas et al.
D879,375 S 3/2020 Go et al.
10,773,403 B2 9/2020 Washington et al.
D898,285 S * 10/2020 Goeder .......................... D28/48
D907,291 S * 1/2021 Michelsen ..................... D28/46
D911,608 S 2/2021 Riehle et al.
D912,990 S * 3/2021 Cagle ............................. D4/101
D913,593 S 3/2021 Hodgson
D931,535 S * 9/2021 Fyfield ........................... D28/48
D933,891 S 10/2021 Randhawa et al.
11,230,023 B2 1/2022 Petratou et al.
D945,068 S 3/2022 Lee
D945,703 S * 3/2022 Mohite .......................... D28/48
D955,640 S * 6/2022 Leatherman ................... D28/46
D957,056 S 7/2022 Siegmann
11,472,052 B2 10/2022 Lin et al.
11,571,828 B2 2/2023 Johnson et al.
D980,526 S * 3/2023 Waterman ...................... D28/48
11,613,035 B2 3/2023 Bourque et al.
2007/0050995 A1 3/2007 Schnak et al.
2008/0148579 A1 6/2008 Bozikis et al.
2008/0201966 A1 8/2008 Psimadas et al.
2010/0064521 A1 * 3/2010 DeLong .................. B26B 21/52
30/535
2010/0175270 A1 7/2010 Psimadas et al.
2014/0150264 A1 * 6/2014 Micinilio .............. B26B 21/522
30/41
2015/0328788 A1 11/2015 Ren et al.
2017/0282392 A1 10/2017 Maimone et al.
2019/0299474 A1 10/2019 Bourque et al.
2020/0114535 A1 * 4/2020 Wattam ................. B26B 21/522
2021/0221012 A1 7/2021 Moffat

* cited by examiner

SHAVING APPARATUS WITH SLIP PROOF GRIP

BACKGROUND OF THE DISCLOSURE

While in the process of shaving, one may find it hard to maintain a good grip on a razor shaving handle due to its size and design. This unreliable grip will often cause one to lose control of the razor, resulting in an increase in lacerations and scarring during the shaving process.

Because of the unreliable grip, the small size, and the awkward shape of most shaving razor handles on the market right now, it is difficult to hold and safely shave without slipping, bobbling, or dropping the shaving razor handle. This unreliable grip commonly causes painful lacerations that have the risk of dangerous infection and scarring.

SUMMARY OF THE DISCLOSURE

The apparatus of the present application addresses the aforementioned problems in the art by providing an improved shaving handle for razors.

The location of the divots and grooves on shaving handle of the apparatus of the present application shape to fit any side hand, left or right, in a variety of different positions, resulting in a reliable grip during the shaving process. The divots and grooves contour to the hand and fingers in a variety of reliable positions adjusting to one's personal shaving technique.

Most, if not all, shaving handles on the market are small, narrow, and awkward to hold, allowing for an unreliable grip while the razor blade is in contact with the skin. The handle design of the apparatus of the present application is not only longer in length, but the location of the divots and grooves on the shaving razor handle shape to the hand and fingers of a user to give a reliable grip.

In accordance with a first aspect of the present application, a shaving apparatus is provided which includes an elongated handle. The elongated handle may comprise: a plurality of bulges arranged along the length of the elongated handle including: a first bulge arranged at a first end of the elongated handle, a second bulge adjacent to the first bulge, a third bulge adjacent to the second bulge, and a fourth bulge adjacent to the third bulge and arranged near a second end of the elongated handle opposite the first end; an elongated finger disposed in between the first bulge and the second bulge; a gap between each of the second bulge and third bulge and the third bulge and fourth bulge; and a flat paddle arranged at the second end of the elongated handle. Implementations of the shaving apparatus of the first aspect of the present application may include one or more of the following features:

The shaving apparatus may include an attachment member extending from the first end of the elongated handle that is configured to attach the elongated handle to a razor cartridge for shaving. The shaving apparatus may further comprise a concave section on an anterior side of the shaving apparatus in between the attachment member and the first bulge.

The flat paddle of the shaving apparatus may comprise a hole therethrough.

The elongated finger disposed in between the first bulge and the second bulge of the shaving apparatus can be narrower in width than a maximum width of each of the first bulge and the second bulge.

The second bulge of the shaving apparatus may include a flattened surface on an anterior side of the shaving apparatus. The third bulge and the fourth bulge each may include a substantially triangular cross-section on the anterior side of the shaving apparatus. The gaps in between each the second bulge and the third bulge and the third bulge and the fourth bulge can be concave on the anterior side of the shaving apparatus.

The second bulge, the third bulge and the fourth bulge each may include a substantially triangular cross-section on a posterior side of the shaving apparatus. The gaps in between each of the second bulge and the third bulge and the third bulge and the fourth bulge can be concave on the posterior side of the shaving apparatus.

The gap disposed in between the second bulge and the third bulge can be narrower in width than a maximum width of each of the second bulge and the third bulge, and the gap disposed in between the third bulge and the fourth bulge can be narrower in width than a maximum width of each of the third bulge and the fourth bulge.

The anterior surface and/or the posterior surface of the shaving apparatus may include a plurality of gripping elements arranged thereon.

In accordance with a second aspect of the present application, a shaving apparatus is provided which includes an elongated handle. The elongated handle comprises: a plurality of bulges arranged along the length of the elongated handle including: a first bulge arranged at a first end of the elongated handle, a second bulge adjacent to the first bulge, a third bulge adjacent to the second bulge, and a fourth bulge adjacent to the third bulge and arranged near a second end of the elongated handle opposite the first end; an elongated finger disposed in between the first bulge and the second bulge; a gap between each of the second bulge and third bulge and the third bulge and fourth bulge; and a flat paddle arranged at the second end of the elongated handle. The shaving apparatus of the second aspect of the present application further comprises an attachment member extending from the first end of the elongated handle and a razor cartridge attached to the attachment member.

DETAILED DESCRIPTION OF THE DISCLOSURE

Figure 1A:
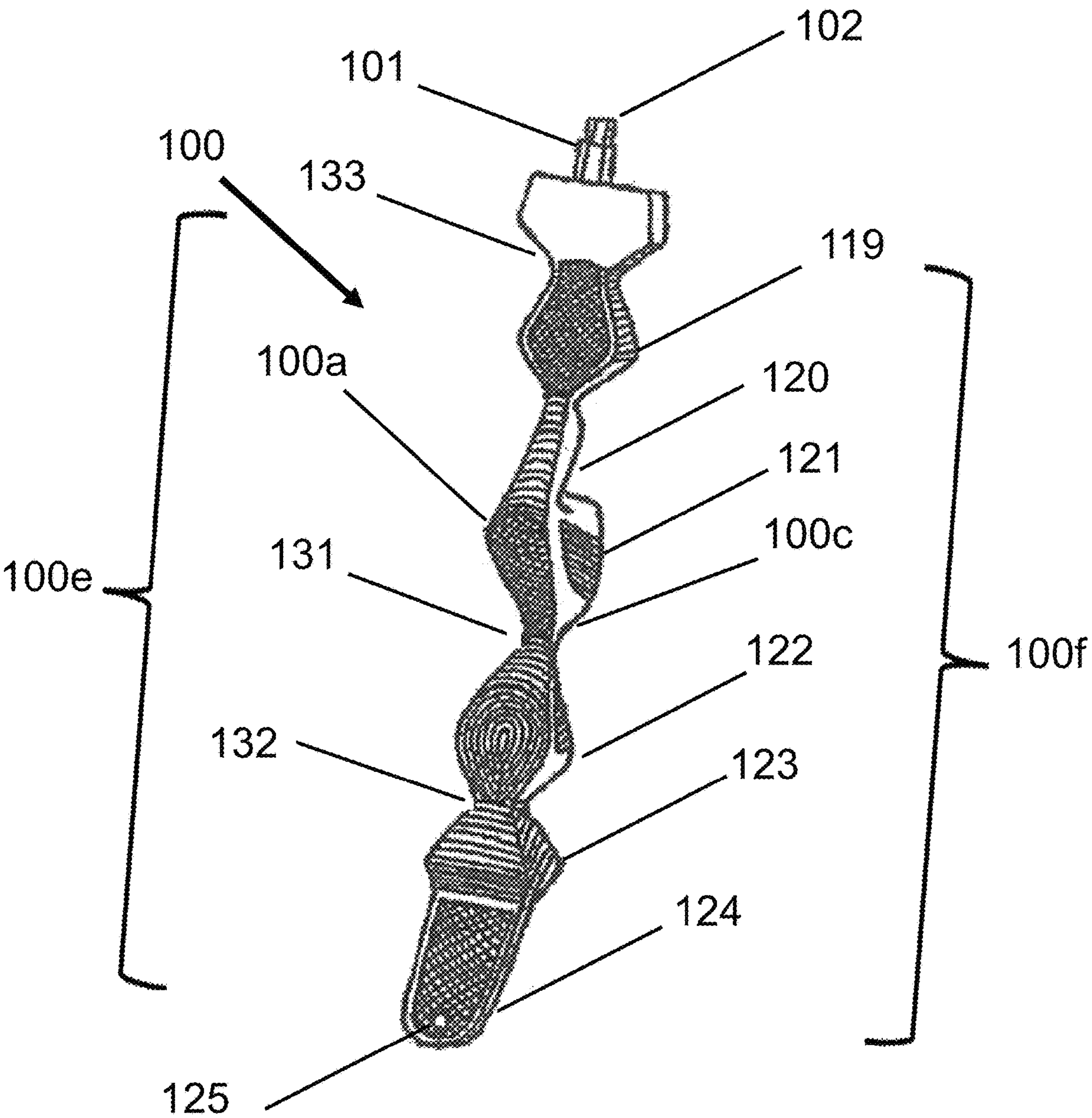
FIG. 1A shows a first view of a razor handle according to the present application.
Figure 1B:
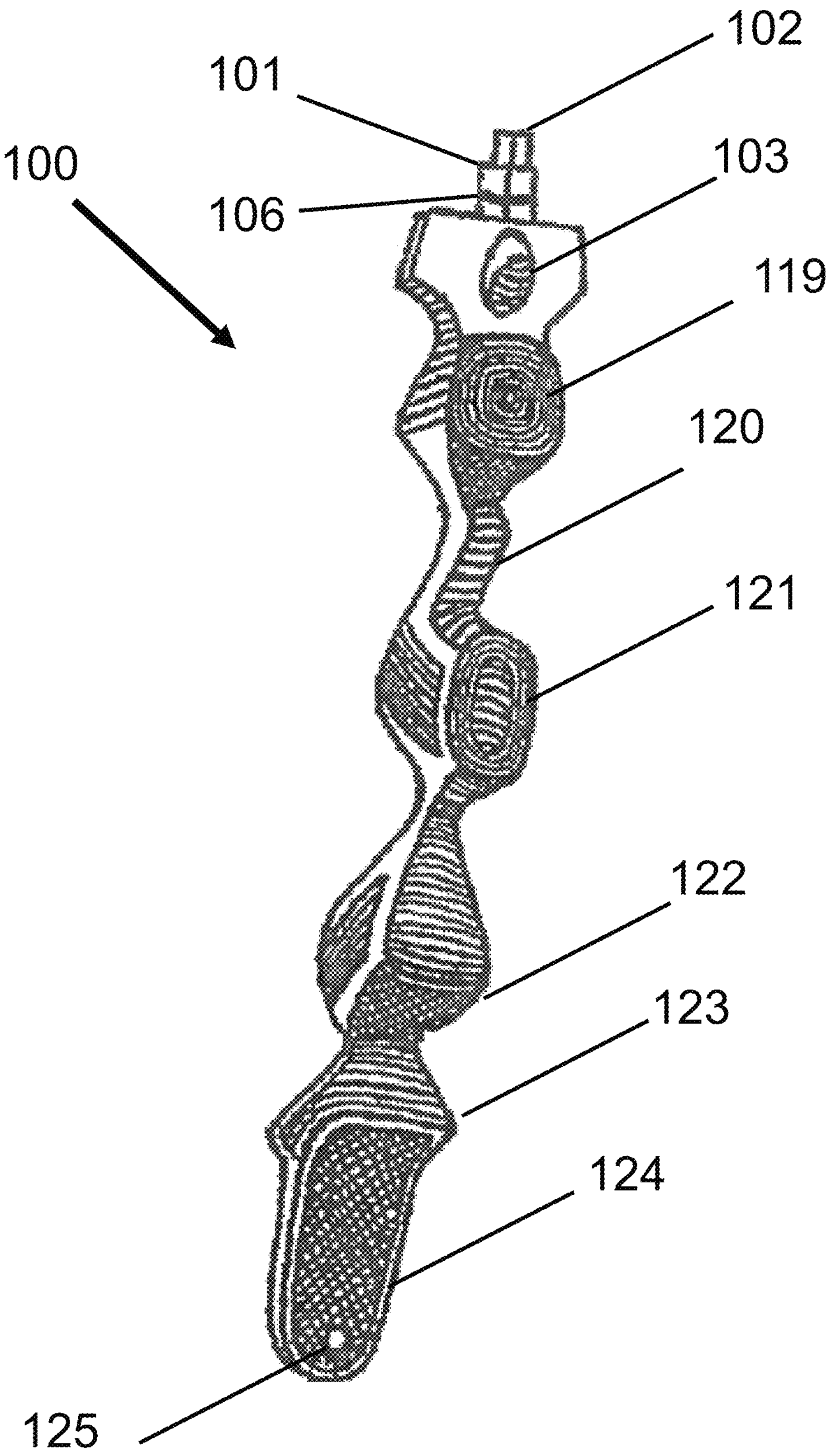
FIG. 1B shows a second view of the razor handle of FIG. 1A.

The apparatus 100 of the present application will now be described with reference made to FIGS. 1-3M.

The apparatus 100 comprises an elongated handle having four separate bulges 119, 121, 122, 123 arranged along its length. The superior-most bulge 119 on the shaving handle is followed by a connector finger piece 120, then a second bulge 121, third bulge 122, and a fourth bulge 123. Ending the handle piece is a flat paddle 124 at the inferior most end of the apparatus handle. Inside this flat paddle is a hole 125 that can be used for docking purposes. In between each pair of adjacent bulges (119, 121; 121, 122; 122, 123), a gap is provided. The finger 120, arranged between the first bulge 119 and second bulge 121 may be more elongated than the gaps 131, 132 between the other bulges, 121, 122, 123. The bulges 119, 121, 122, 123 can take various shapes, including for example having peaked or triangular surfaces (shown for example in bulges 122, 123 of FIGS. 1A-2D), having flat surfaces (shown for example on the anterior surface of bulge 121 in FIG. 2D), having rounded surfaces, or a having a combination thereof as shown in the Figures. The apparatus includes an anterior side 100*a* having an anterior surface 100*b* thereon, and a posterior side 100*c* having a posterior surface 100*d* thereon, and lateral sides 100*e*, 100*f*, which are shown generally in FIG. 1A and FIG. 2A.

In operation, the user will hold the apparatus 100 as a whole in one hand. To attach the apparatus 100 to a disposable shaving cartridge 130, an attachment member 101 on an end of the apparatus 100 opposite the paddle 124 is inserted into a flexible receptacle on the cartridge. A user can position a hand with a reliable grip using the four separate bulges 119, 121, 122, 123, connector finger piece 120, and flat paddle 124 on the handle section of the apparatus 100. The specific shape, size and location of the four separate bulges 119, 121, 122, 123, connector finger piece 120, and flat paddle 124 allow for this reliable and safe grip during shaving process. Once a successful grip is maintained and the disposable cartridge 130 is intact shaving process can begin.

Once a successful shaving process is complete, the user may detach the disposable cartridge 130. An extending member 102 of attachment member 101 is snugly attached into a receptacle on the disposable cartridge 130 and a spring maintains the attachment. The user can press the finger piece 103 with his or her finger, to propel forward the extending member 102 and the spring. The forward motion forces extending member 102 to extend out, revealing 106 itself and pushing the receptacle away from the attachment member 101. The protruding ridge releases the female divots as the walls flex open enough to release grip. Once the finger piece 103 is released, the spring will be released to force finger piece 103 back in home position.

To make the apparatus 100 of the present application, a mold can be created with an inner core that will shape the razor handle. In addition, the superior inner core has a space that puts in place the mechanism that detaches and attaches the cartridge 130. Silicon, plastic, rubber, or a non-slip compound can be poured into the mold, to form the razor blade handle and the attachment member 101 of the apparatus 100. Anterior and posterior gripping elements 134*a*, 134*b* on the surface can be straight ridges, rounded or spiral ridges, collections of bumps, or a combination thereof, as shown in the Figures. In certain embodiments of the apparatus 100, some of the elements 119-124 or gaps between them may comprise gripping elements 134*a*, 134*b* thereon, while others do not, as shown for example in FIGS. 2A-2C. A concave section 133 can be provided on the anterior side 100*a* of the shaving apparatus 100 in between the attachment member 100 and the first bulge 119. Once that process is complete, additional rubber gripping and grooves can be applied to exterior of the apparatus 100 to create the maximum no slip grip. Once the apparatus 100 is created, a disposable cartridge 130 can be attached to the attachment member 101 and can be changed at the user's leisure.

In an example embodiment of the apparatus 100, the various elements of the handle may have dimensions as follows: the superior-most bulge 119 can be approximately 14.3 mm at its widest point, 17.0 mm at its longest point, and 11.4 mm at its highest point; the connector finger piece 120 between the first bulge 119 and second bulge 121 can measure approximately 7.0 mm at its widest point, 10.0 mm at its longest point, and 7.7 mm at its highest point; the second bulge 121 can measure approximately 13.0 mm at its widest, 19.5 mm at its longest, and 22.15 mm at its highest; the third bulge 122 can measure approximately 16.40 mm at its widest, 24.0 mm at its longest, and 19.8 mm at its highest; the fourth bulge 123 can measure approximately 6.8 mm at its widest, 12.6 mm at its longest point, and 13.1 mm at its highest; flat paddle 124 at the inferior-most end of handle can measure approximately 17.75 mm at its widest, 30.0 mm at its longest, and 4.0 mm at its highest; and approximately 8.0 mm from the base of paddle 124 there is a hole 125 that measures approx. 5.0 mm. It is to be noted that these dimensions are exemplary, and other dimensions may be provided for in other embodiments of the apparatus 100.

The apparatus 100 of the present application can be used in connection with a disposable shaving cartridge 130. The disposable shaving cartridge 130 comprises a disposable razor head. The cartridge 130 is the disposable portion of the shaving razor. When the disposable cartridge 130 is attached, the attachment member 101 with protruding ridge fits inside of the flexible receptacle and engages the female divots via the protruding ridge. Inside of the large outer attachment member 101 is an extending member 102, that is attached to and controlled by a finger piece 103. Once the finger piece 103 is pressed, the extending member 102 will reveal itself to proceed with the detachment process. A small spring is also attached and controlled by the finger piece 103. The spring is compressed while finger piece 103 is pressed, and once released the spring returns to a home position and helps assist the finger piece 103 back to the home position.

Figure 2A:
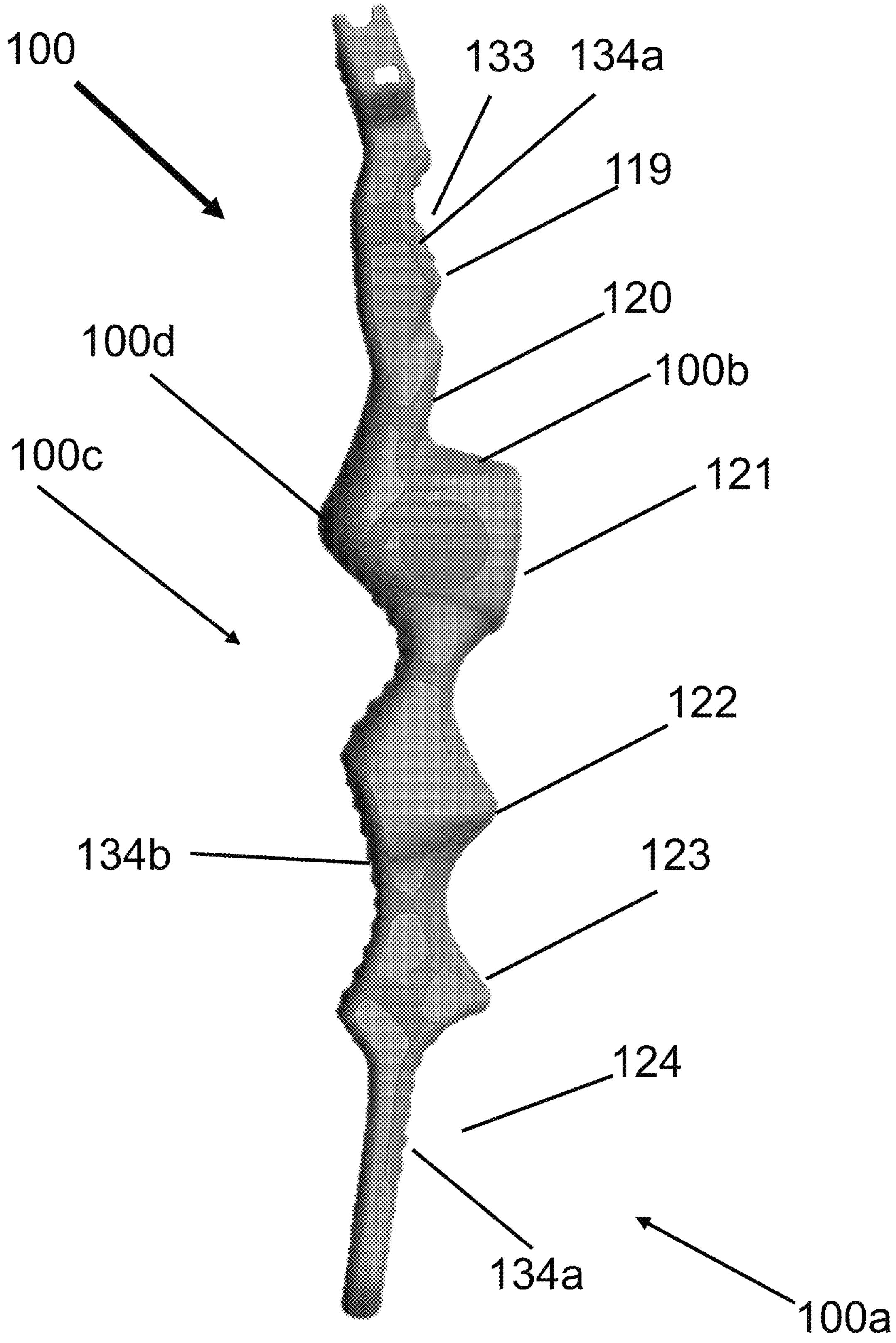
FIG. 2A shows a first view of a further razor handle according to the present application.
Figure 2B:
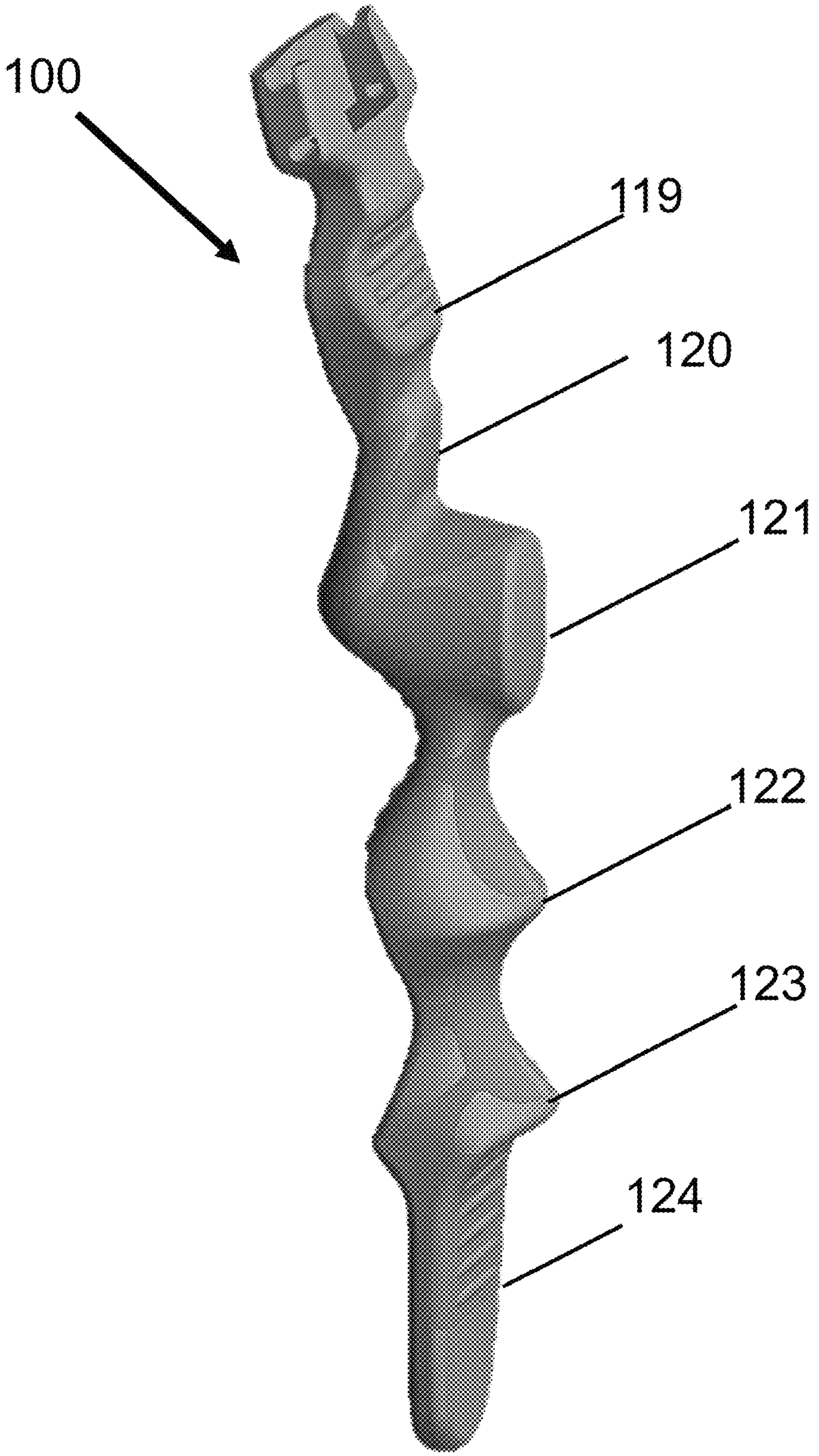
FIG. 2B shows a second view of the razor handle of FIG. 2A.
Figure 2C:
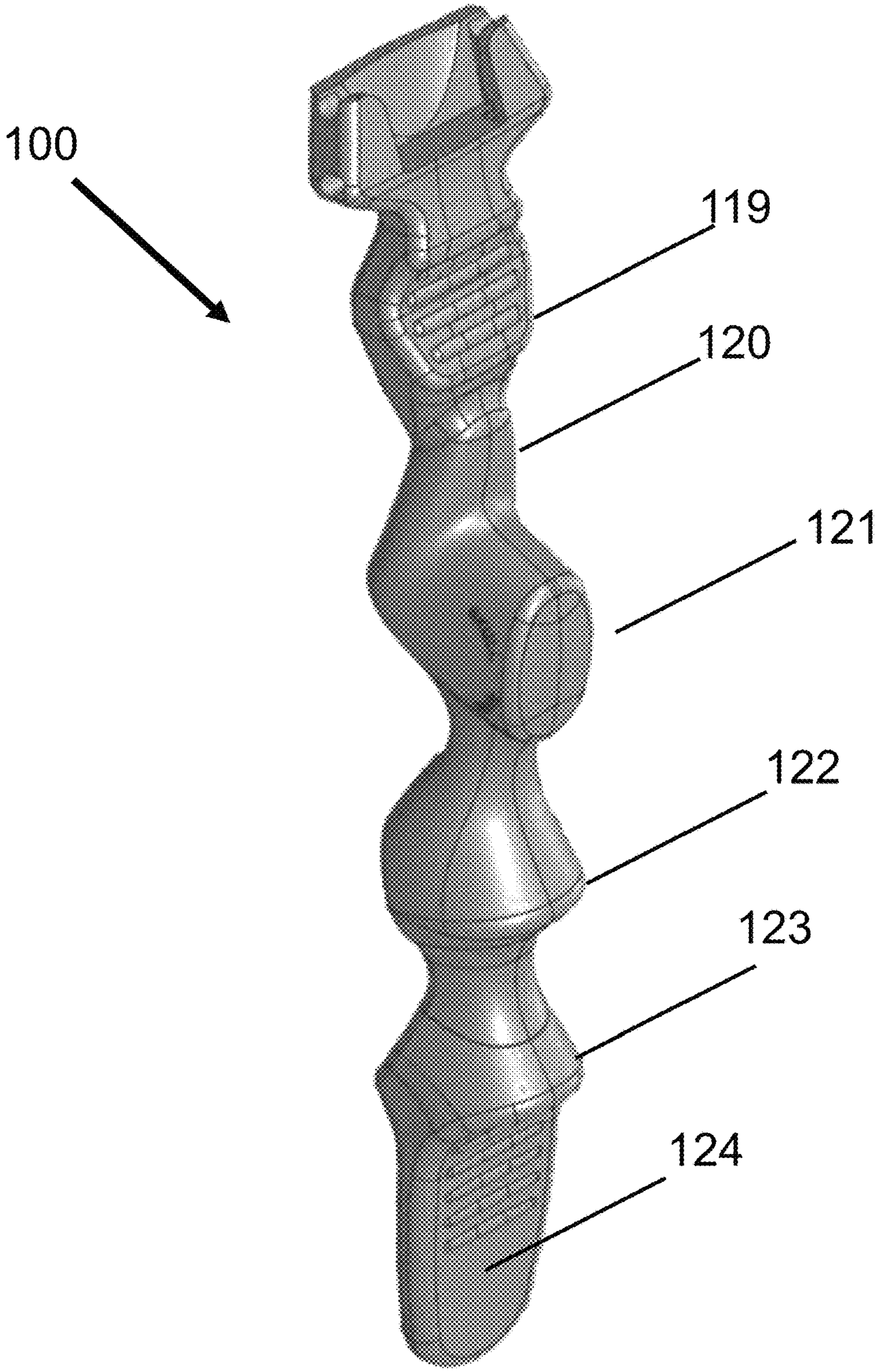
FIG. 2C shows a further razor handle according to the present application.
Figure 2D:
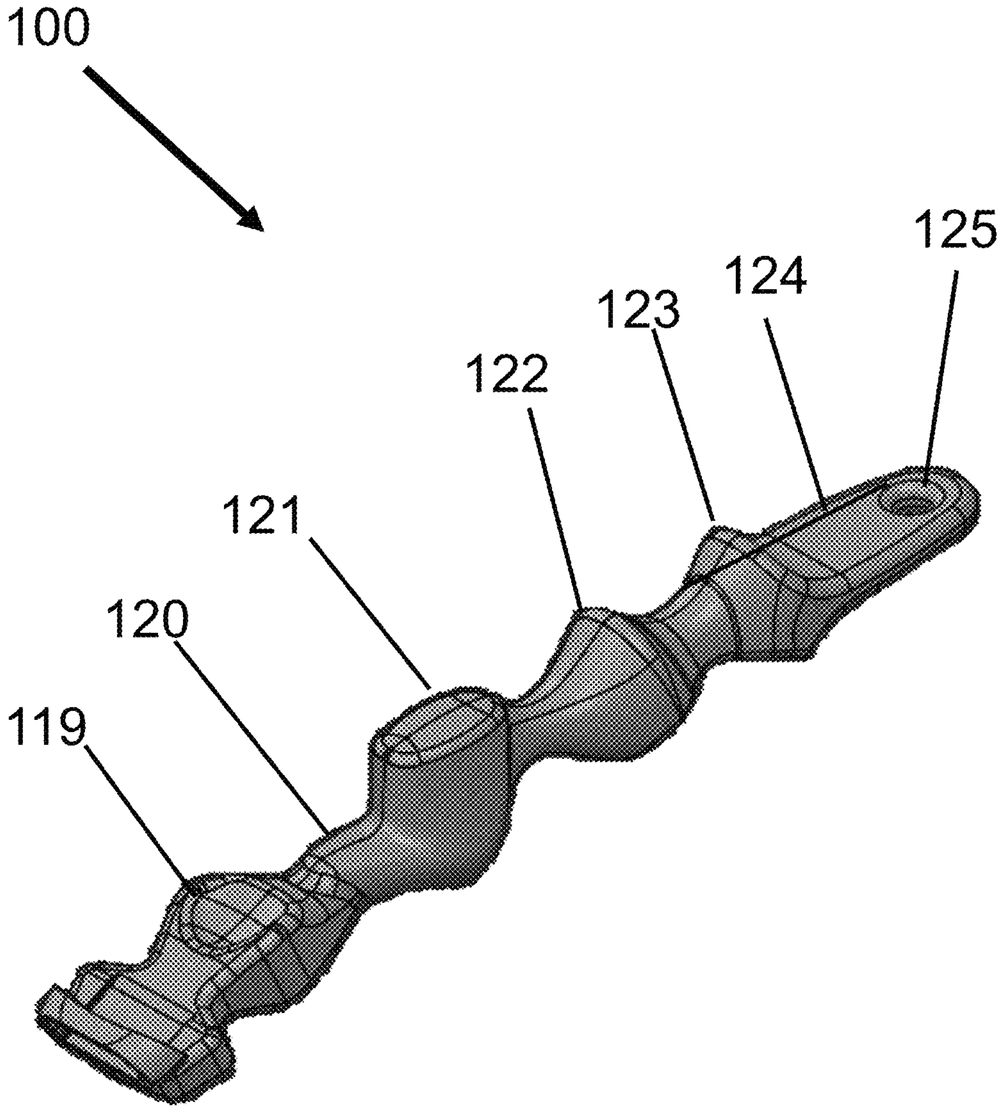
FIG. 2D shows a still further razor handle according to the present application.
Figure 3A:
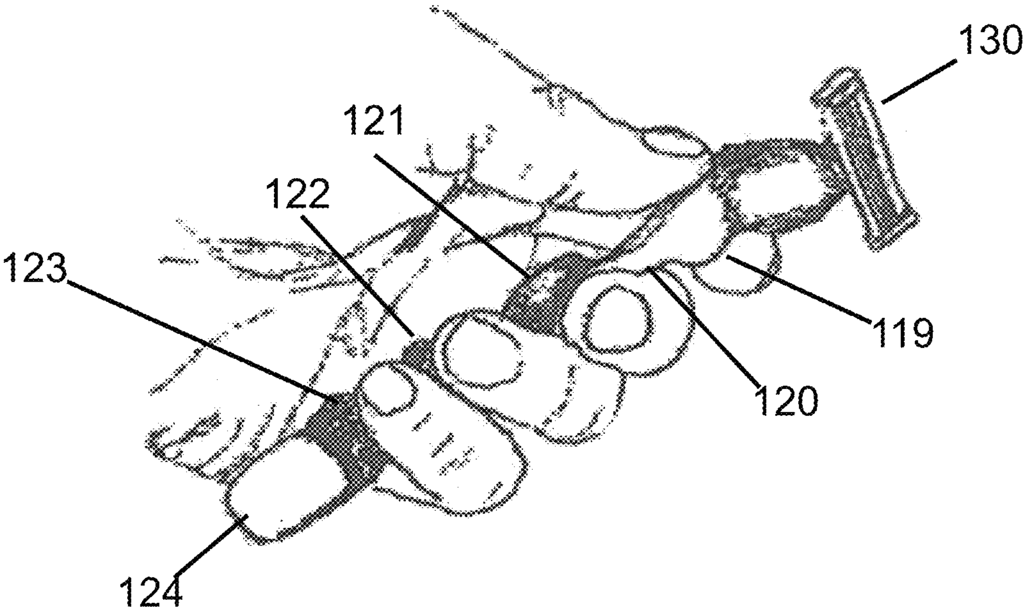
FIG. 3A shows a first example hand position during use of the razor handle of the present application.

It is noted that other connection mechanisms can be provided for the apparatus that differ from that shown in FIGS. 3A-4. For example, FIGS. 2A-2C show an apparatus having an attachment member lacking an extending member, into which a shaving cartridge can snap into place through a plurality of slots in the attachment member. In the apparatus 100 of FIG. 2D, a horizontal slot is provided into which a disposable cartridge can be inserted. The apparatus 100 of the present application is not intended to be limited to use with any type or configuration of shaving cartridge, and therefore may be presented in a variety of configurations with different attachment mechanisms to accommodate such shaving cartridges.

The parts mentioned in the above paragraph allow the apparatus to work to its maximum effectiveness, but there may be additional elements, such as the materials used on the disposable razor blade head that may be interchanged (one version catered to a man, another version catered to woman), or a storage mechanism for the whole apparatus.

The placement and arrangement of the bulges 119, 121, 122, 123, finger 120, and paddle 124 provide an apparatus 100 that is advantageous in its use by allowing for many possible hand positions during use. The apparatus 100 can be held in a number of different ways by the user, so the user can adapt it to different uses or shaving surfaces, or different users can hold it in a different arrangement according to their comfort level. Examples of such hand positions are shown in FIGS. 3A-3M.

FIG. 3A shows a first example of a hand position during use of the apparatus 100. The user's thumb and second digit grip onto the lateral sides of the first bulge 119. The user's third digit rests on the posterior side of the connector finger piece 120. The user's fourth digit rests in between the posterior side of the second bulge 121 and the posterior side of the third bulge 122. The user's fifth digit rests in between the posterior side of the third bulge 122 and the posterior side of the fourth bulge 123.

Figure 3B:
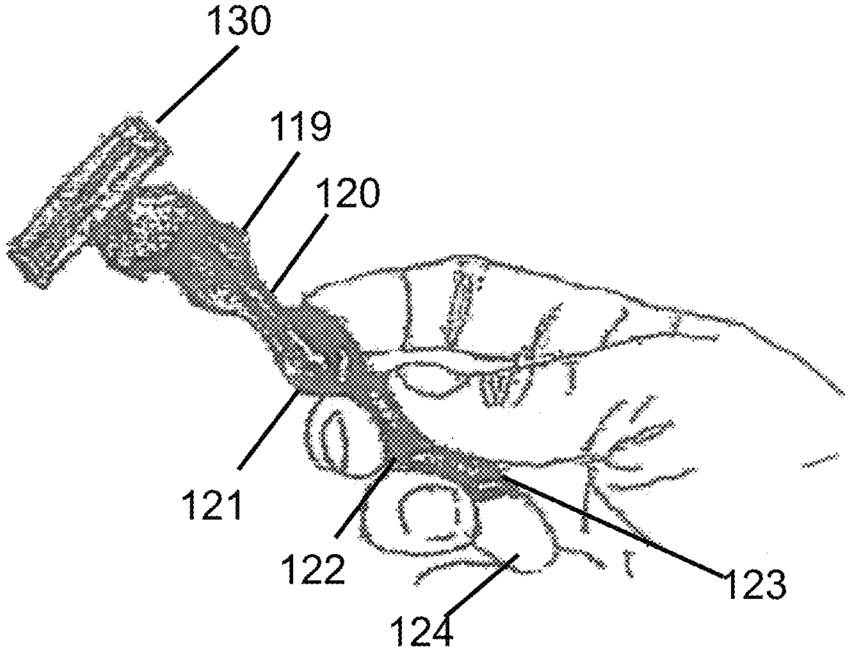
FIG. 3B shows a second example hand position during use of the razor handle of the present application.

FIG. 3B shows a second example of a hand position during use of the apparatus 100. The user's thumb helps grip on the left lateral side of the apparatus 100 between the second bulge 121 and third bulge 122. The user's second digit rests on the anterior side of the second bulge 121. The user's third digit rests on the right lateral side of the third bulge 122. The user's fourth digit wraps around and on posterior side in between the third bulge 122 and the fourth bulge 123. The user's fifth digit tests on posterior side of the flat paddle 124.

Figure 3C:
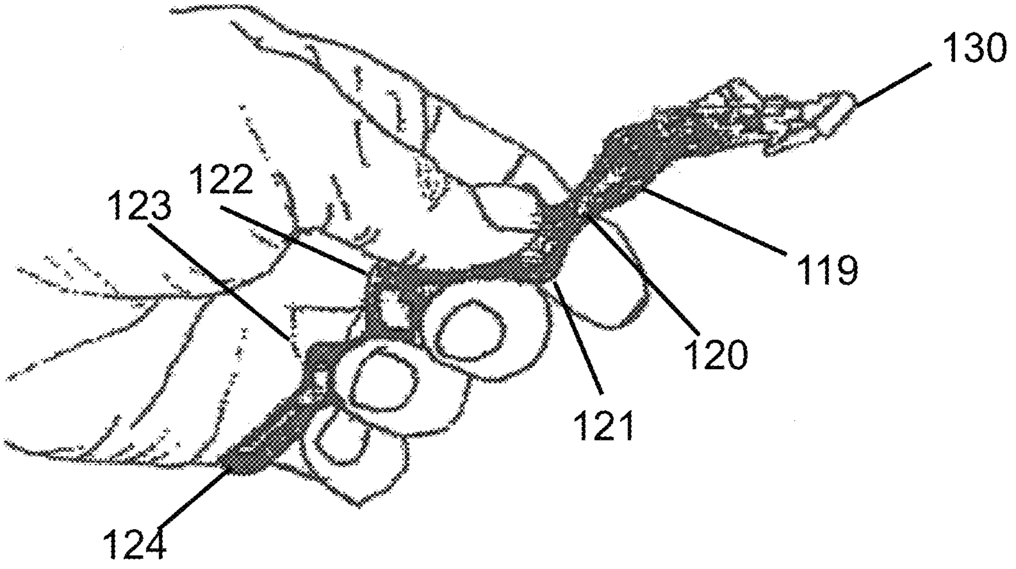
FIG. 3C shows a third example hand position during use of the razor handle of the present application.

FIG. 3C shows a third example hand position during use of the apparatus 100. The user's second digit grips the right lateral side of the connector finger piece 120, and the user's thumb is on left lateral side of the connector finger piece 120. The user's third digit is on the posterior side between the second bulge 121 and the third bulge 122. The user's fourth digit is resting in between the third bulge 122 and the fourth bulge 123. The user's fifth digit is resting on the uppermost posterior part of the flat paddle 124.

Figure 3D:
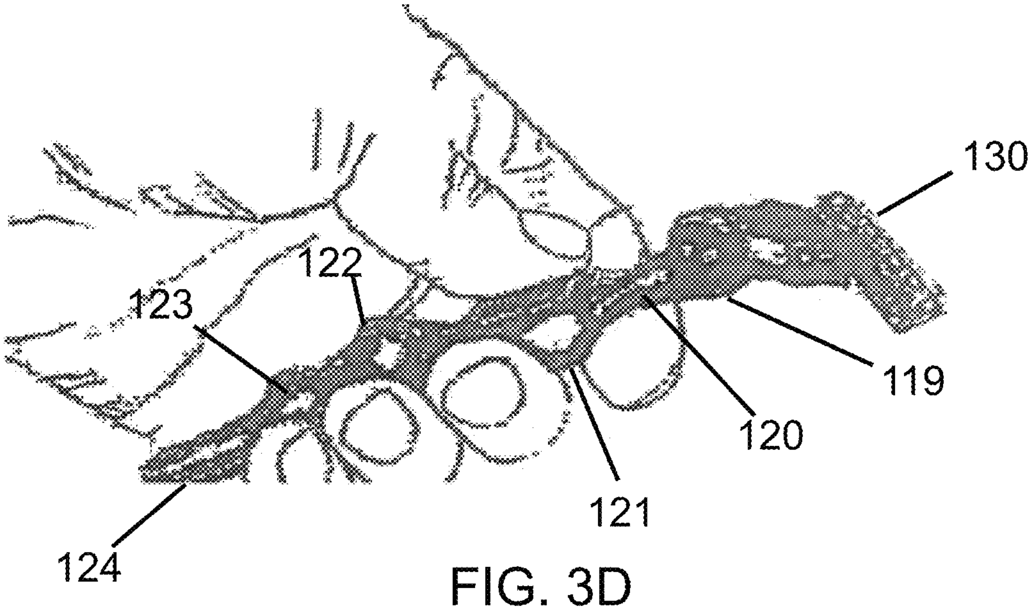
FIG. 3D shows a fourth example hand position during use of the razor handle of the present application.

FIG. 3D shows a fourth example of a hand position during use of the apparatus 100. The user's second digit grips on the posterior side of the connector finger piece 120. The user's thumb grips the anterior side of the second bulge 121, and the third digit rests on the posterior gap between the second bulge 121 and the third bulge 122. The user's fourth digit wraps around and between the third bulge 122 and the fourth bulge 123, and the fifth digit wraps around the flat paddle 124.

Figure 3E:
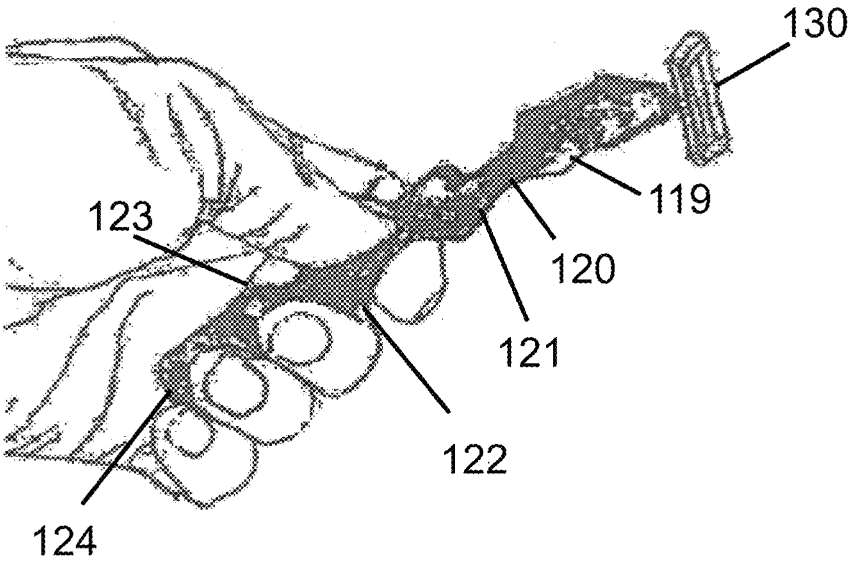
FIG. 3E shows a fifth example hand position during use of the razor handle of the present application.

FIG. 3E shows a fifth example of a hand position during use of the apparatus 100. The user's thumb grips the left lateral gap between the second bulge 121 and the third bulge 122. The user's second digit wraps around the base of the gap between the second bulge 121 and the third bulge 122. The user's third digit wraps around the base of the third bulge 122 and the fourth bulge 123. The user's fourth and fifth digits wrap around the flat paddle 124.

Figure 3F:
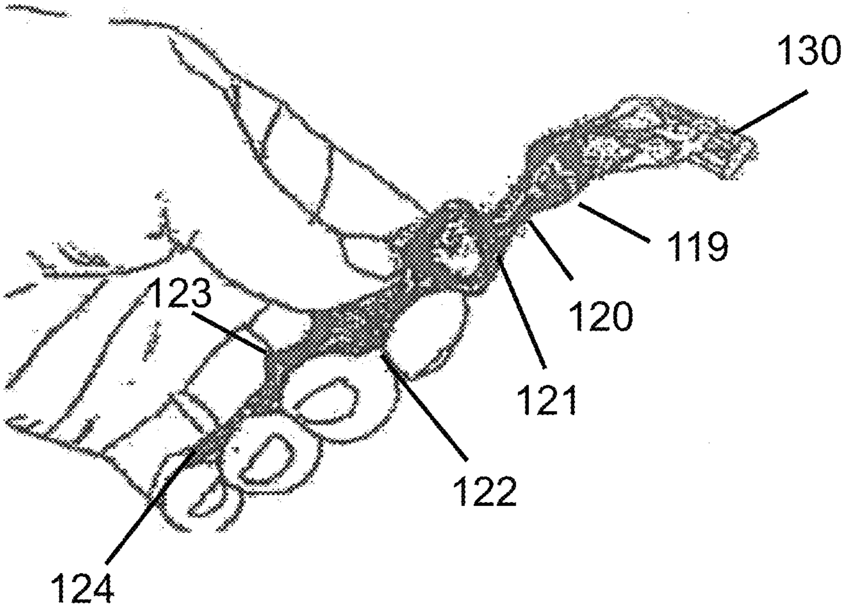
FIG. 3F shows a sixth example hand position during use of the razor handle of the present application.

FIG. 3F shows a sixth example of a hand position during use of the apparatus 100. The user's thumb grips the anterior side gap between the second bulge 121 and the third bulge 122. The user's second digit wraps around the base of the gap between the second bulge 121 and the third bulge 122. The user's third digit wraps around the base of the third bulge 122 and the fourth bulge 123. The user's fourth and fifth digits wrap around the flat paddle 124.

Figure 3G:
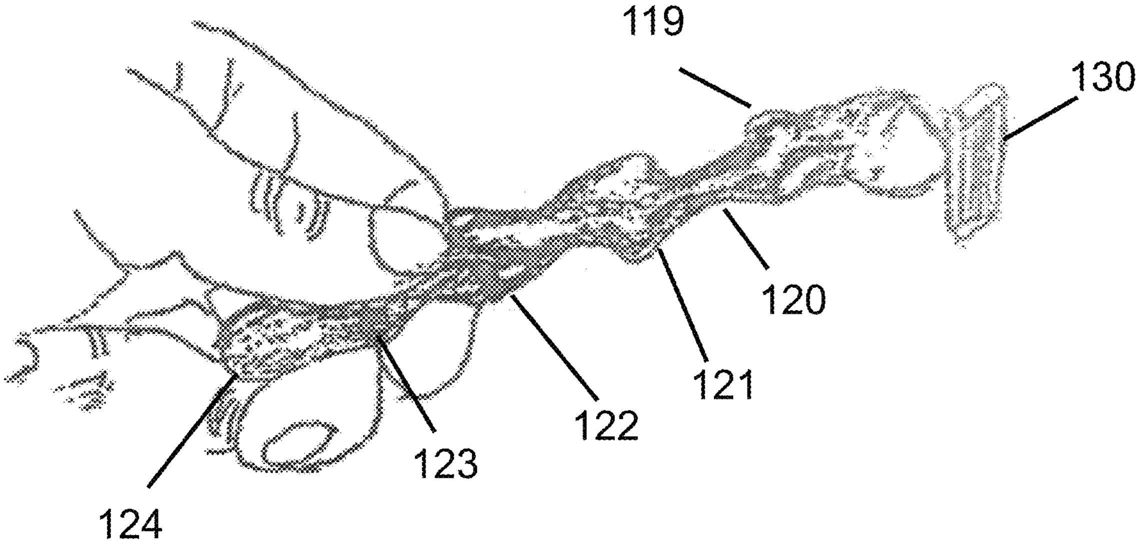
FIG. 3G shows a seventh example hand position during use of the razor handle of the present application.

FIG. 3G shows a seventh example of a hand position during use of the apparatus 100. The user's thumb grips the left lateral side between the third bulge 122 and the fourth bulge 123. The user's second digit grips the right lateral side between the third bulge 122 and the fourth bulge 123, and the user's third digit wraps around the posterior side of the flat paddle 124.

Figure 3H:
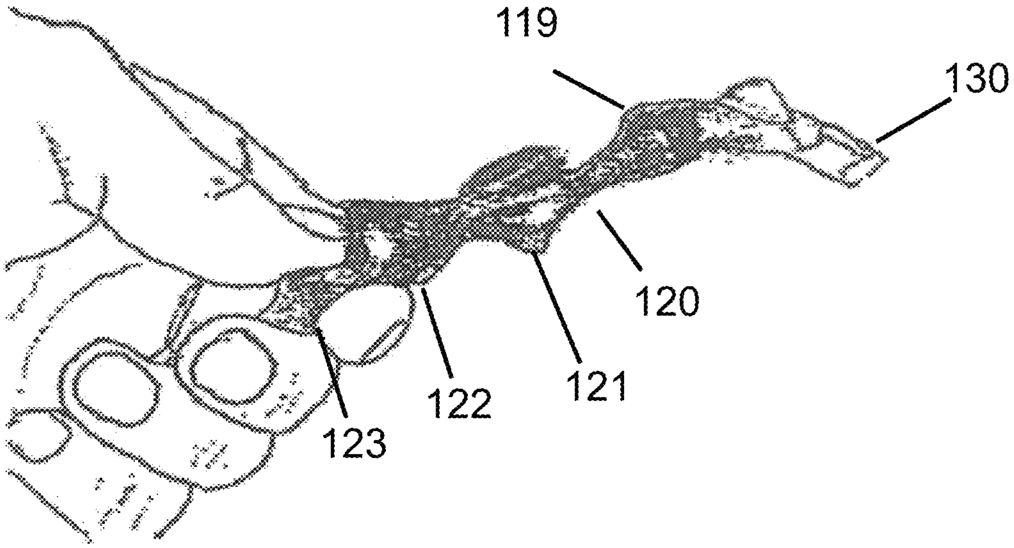
FIG. 3H shows an eighth example hand position during use of the razor handle of the present application.

FIG. 3H shows an eighth example of a hand position during use of the apparatus 100. The user's thumb grips the anterior side between the third bulge 122 and the fourth bulge 123. The user's second digit wraps around the posterior side between the third bulge 122 and the fourth bulge 123. The user's third digit wraps around the flat paddle 124.

Figure 3I:
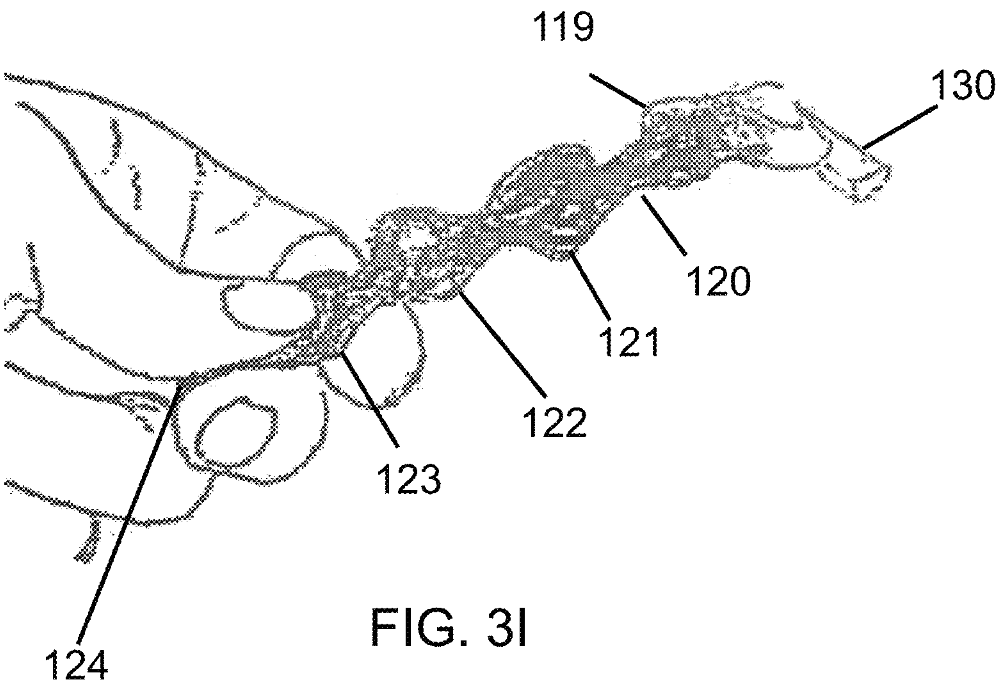
FIG. 3I shows a ninth example hand position during use of the razor handle of the present application.

FIG. 3I shows a ninth example of a hand position during use of the apparatus 100. The user's second digit rests on the posterior side between the third bulge 122 and the fourth bulge 123, and the user's thumb grips the anterior side of the flat paddle 124. The user's third digit grips the base of the flat paddle 124.

Figure 3J:
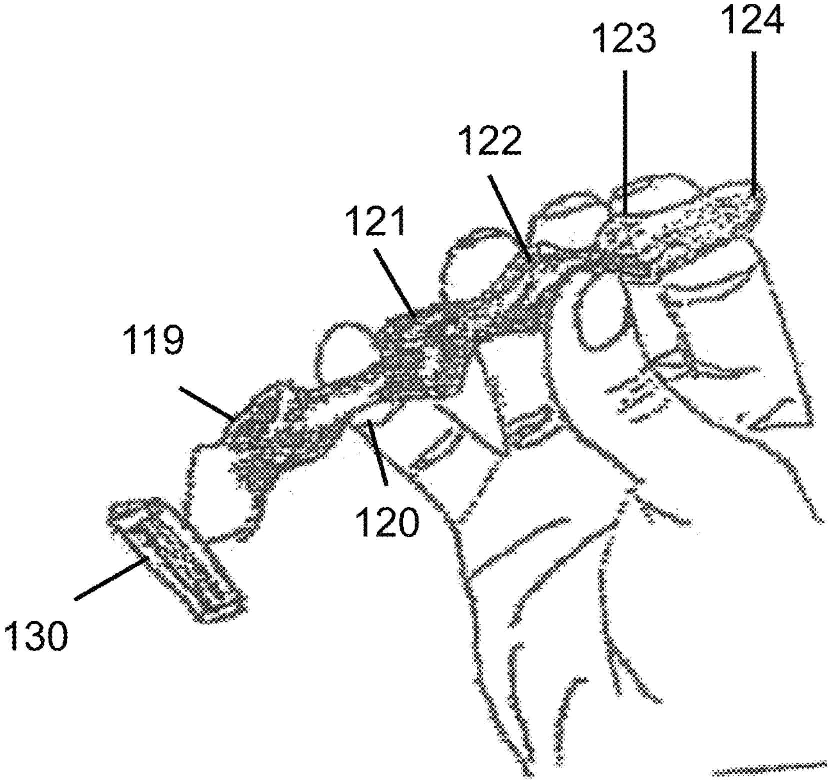
FIG. 3J shows a tenth example hand position during use of the razor handle of the present application.

FIG. 3J shows a tenth example hand of a position during use of the apparatus 100. The user's fifth digit rests on the anterior side of the connector finger piece 120, and the user's fourth digit rests on the anterior side between the second bulge 121 and the third bulge 122. The user's third digit grips the gap between the third bulge 122 and the fourth bulge 123 anterior side. The user's second digit grips the anterior side of the flat paddle 124, and the user's thumb grips the posterior side between the third bulge 122 and the fourth bulge 123.

Figure 3K:
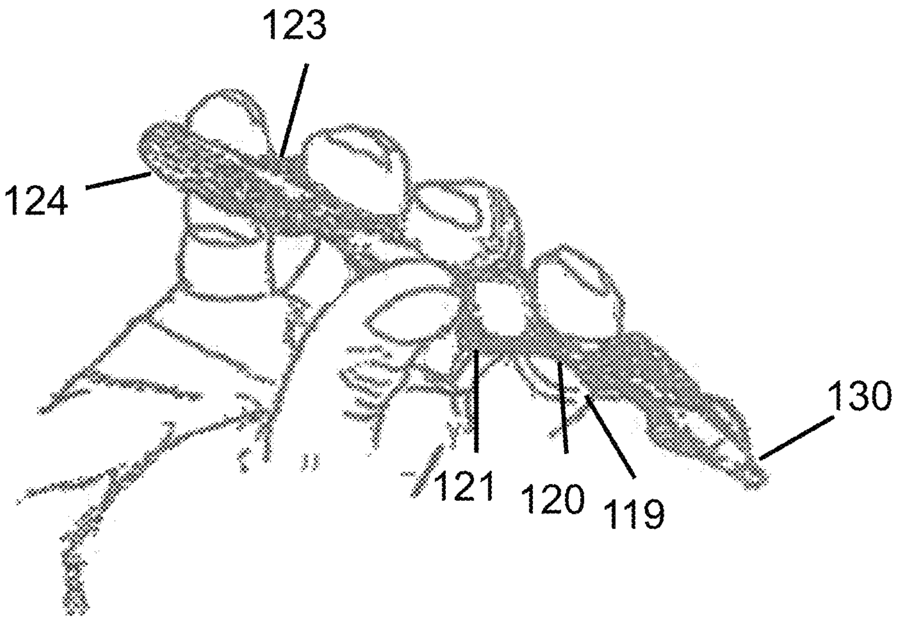
FIG. 3K shows an eleventh example hand position during use of the razor handle of the present application.

FIG. 3K shows an eleventh example of a hand position during use of the apparatus 100. The user's second digit rests on the anterior side of the connector finger piece 120, and the user's third digit grips the anterior gap between the second bulge 121 and the third bulge 122. The user's thumb grips the posterior side gap between the second bulge 121 and the third bulge 122. The user's fourth digit rests on the gap between the third bulge 122 and the fourth bulge 123, and the user's fifth digit rests on the anterior side of the flat paddle 124.

Figure 3L:
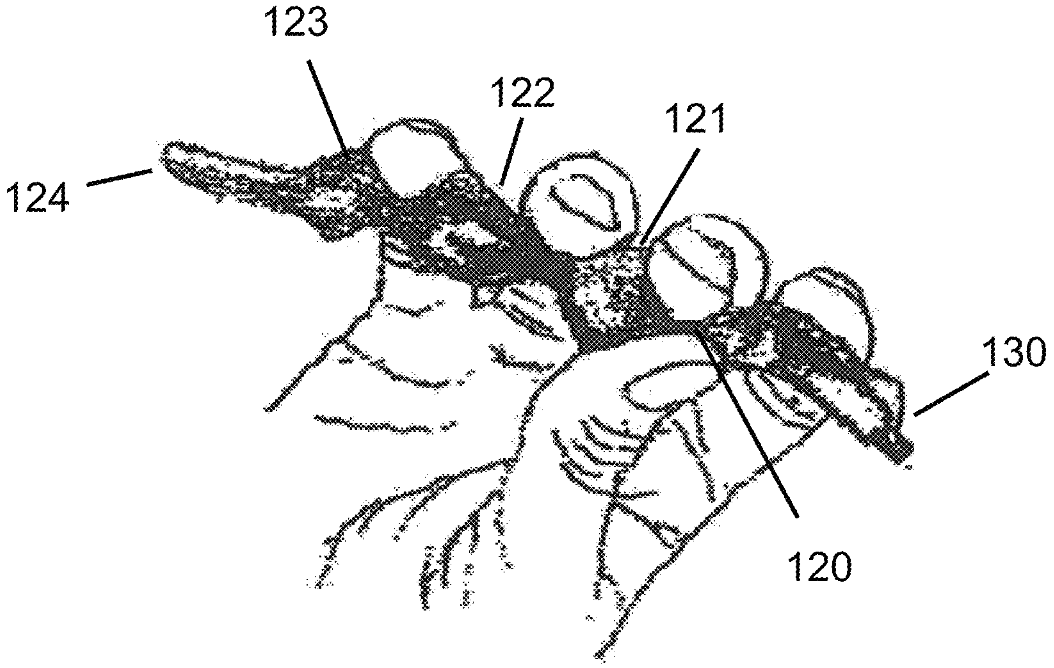
FIG. 3L shows a twelfth example hand position during use of the razor handle of the present application.

FIG. 3L shows a twelfth example of a hand position during use of the apparatus 100. The user's second digit rests on the interior side of the first bulge 119. The user's third digit grips the anterior side of the finger connector piece 120. The user's fourth digit rests on the anterior gap between the second bulge 121 and the third bulge 122. The user's fifth digit rests on the anterior gap between the third bulge 122 and the fourth bulge 123, and the user's thumb rests on the posterior side of the connector finger piece 120.

Figure 3M:
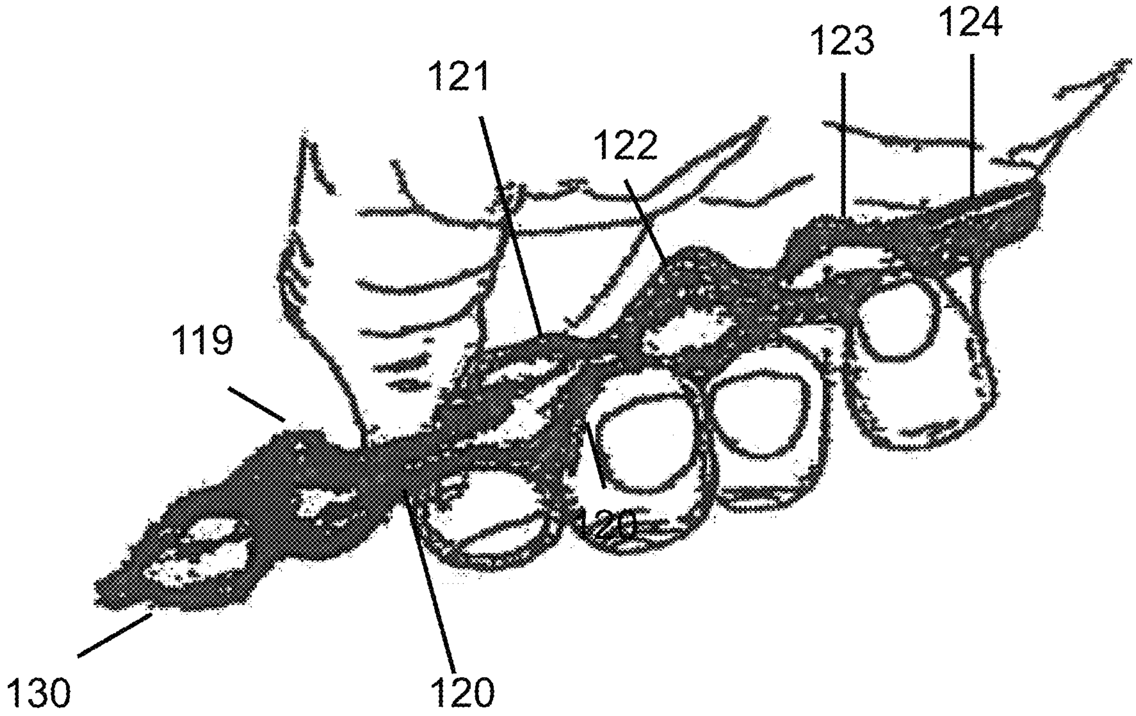
FIG. 3M shows a thirteenth example hand position during use of the razor handle of the present application.

FIG. 3M shows a thirteenth example of a hand position during use of the apparatus 100. The user's thumb grips the second bulge 121, and the user's second digit rests on posterior base gap between second bulge 121 and the third bulge 122. The user's third digit rests on the base of the fourth bulge 123, and the user's fifth digit rests on the base of the paddle 124.

As used herein, directional or positional terms such as "front", "rear", "upper", "lower", "top", "bottom", etc., are used for explanatory purposes and are not limiting.

While there have been shown and described and pointed out fundamental novel features of the invention as applied to embodiments thereof, it will be understood that various omissions and substitutions and changes in the form and details of the apparatus and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed:

1. An apparatus comprising:
an elongated handle comprising:
a plurality of bulges arranged along a length of the elongated handle including:
a first bulge arranged at a first end of the elongated handle,
a second bulge adjacent to the first bulge,
a third bulge adjacent to the second bulge, and
a fourth bulge adjacent to the third bulge and arranged near a second end of the elongated handle opposite the first end;
an elongated finger disposed in between the first bulge and the second bulge;
a gap between each of the second bulge and third bulge and the third bulge and fourth bulge; and
a flat paddle arranged at the second end of the elongated handle; and
an attachment member extending from the first end of the elongated handle that is configured to attach the elongated handle to a razor cartridge for shaving;
wherein the gaps in between each of the second bulge and the third bulge and the third bulge and the fourth bulge are concave on a posterior side of the shaving apparatus;
wherein the gaps in between each the second bulge and the third bulge and the third bulge and the fourth bulge are concave on the anterior side of the apparatus;
wherein the second bulge comprises a flattened surface on the anterior side of the apparatus;
wherein the third bulge and the fourth bulge each comprise a substantially triangular cross-section on the anterior side of the apparatus;
wherein the second bulge, the third bulge and the fourth bulge each comprise a substantially triangular or rounded cross-section on the posterior side of the apparatus;
wherein the elongated finger disposed in between the first bulge and the second bulge is narrower in width than a maximum width of each of the first bulge and the second bulge and is offset from the second, third, and fourth bulge and offset from the gaps between each of the second, third, and fourth bulges; and
wherein an anterior surface of the elongated finger is offset from and leads directly into the anterior surface of the second bulge.

2. The apparatus according to claim 1, wherein the flat paddle comprises a hole therethrough.

3. The apparatus according to claim 1, the elongated handle further comprising a concave section formed on the anterior side of the apparatus in between the attachment member and the first bulge.

4. The apparatus according to claim 1, wherein the gaps in between each of the second bulge and the third bulge and the third bulge and the fourth bulge are concave on both lateral sides of the apparatus.

5. The apparatus according to claim 1, wherein the gap disposed in between the second bulge and the third bulge is narrower in width than a maximum width of each of the second bulge and the third bulge.

6. The apparatus according to claim 1, wherein the gap disposed in between the third bulge and the fourth bulge is narrower in width than a maximum width of each of the third bulge and the fourth bulge.

7. The apparatus according to claim 1, wherein the elongated handle further comprises an anterior surface formed on the anterior side of the shaving apparatus comprises a plurality of gripping elements arranged thereon.

8. The apparatus according to claim 1, wherein the elongated handle further comprises a posterior surface formed on the posterior side of the apparatus comprises a plurality of gripping elements arranged thereon.

9. A shaving apparatus comprising:
an elongated handle comprising:
a plurality of bulges arranged along a length of the elongated handle including:
a first bulge arranged at a first end of the elongated handle,
a second bulge adjacent to the first bulge,
a third bulge adjacent to the second bulge, and
a fourth bulge adjacent to the third bulge and arranged near a second end of the elongated handle opposite the first end;
an elongated finger disposed in between the first bulge and the second bulge;
a gap between each of the second bulge and third bulge and the third bulge and fourth bulge; and
a flat paddle arranged at the second end of the elongated handle;
an attachment member extending from the first end of the elongated handle; and
a razor cartridge attached to the attachment member;
wherein the gaps in between each of the second bulge and the third bulge and the third bulge and the fourth bulge are concave on a posterior side of the shaving apparatus; and
wherein the gaps in between each the second bulge and the third bulge and the third bulge and the fourth bulge are concave on an anterior side of the shaving apparatus;
wherein the second bulge comprises a flattened surface on the anterior side of the apparatus;
wherein the third bulge and the fourth bulge each comprise a substantially triangular cross-section on the anterior side of the apparatus;
wherein the second bulge, the third bulge and the fourth bulge each comprise a substantially triangular cross-section on the posterior side of the apparatus;
wherein the elongated finger disposed in between the first bulge and the second bulge is narrower in width than a maximum width of each of the first bulge and the second bulge and is offset from the second, third, and fourth bulge and offset from the gaps between each of the second, third, and fourth bulges; and wherein an anterior surface of the elongated finger is offset from and leads directly into the anterior surface of the second bulge.

* * * * *